Figure 1:
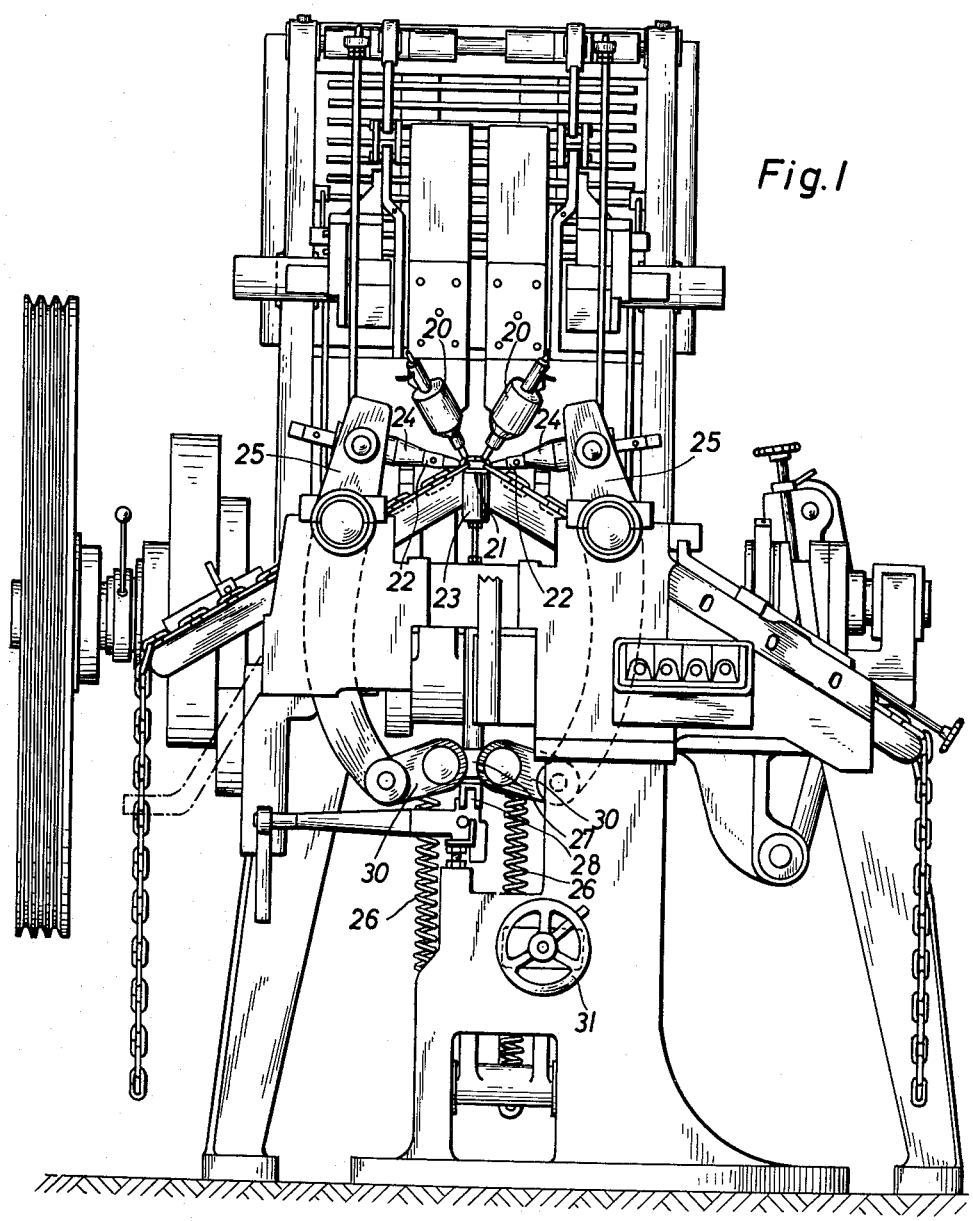

March 6, 1962 P. ESSER 3,024,347
METHOD OF WELDING C OR SIMILARLY SHAPED CHAIN LINKS
Filed Sept. 15, 1959 5 Sheets-Sheet 1

INVENTOR
P. Esser
BY
ATTYS.

March 6, 1962 P. ESSER 3,024,347
METHOD OF WELDING C OR SIMILARLY SHAPED CHAIN LINKS
Filed Sept. 15, 1959 5 Sheets-Sheet 3
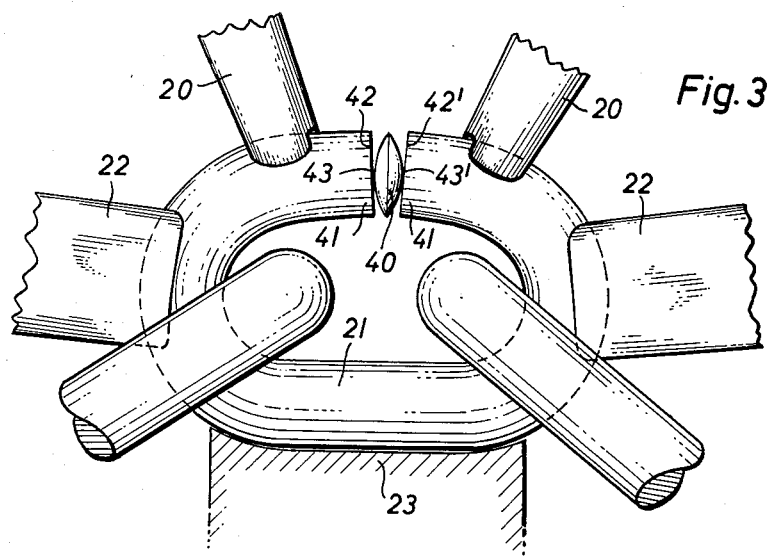
  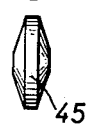
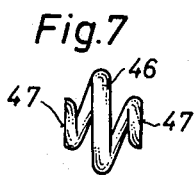 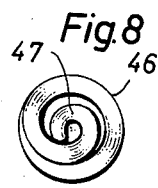 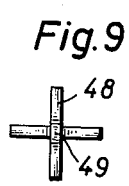 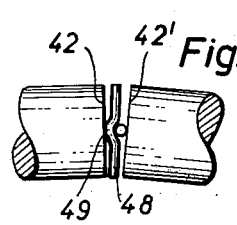
INVENTOR
P. Esser
BY
Glascock Downing Seebold
ATTYS.

March 6, 1962 P. ESSER 3,024,347
METHOD OF WELDING C OR SIMILARLY SHAPED CHAIN LINKS
Filed Sept. 15, 1959 5 Sheets-Sheet 5
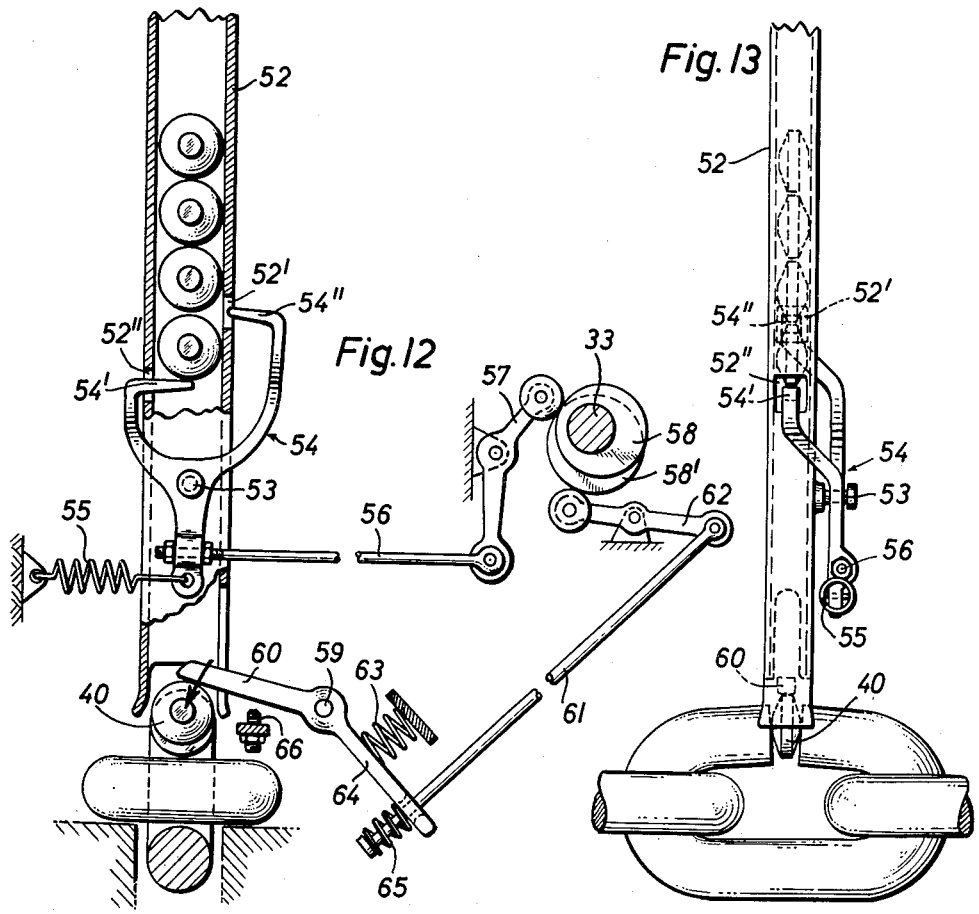
INVENTOR
P. Esser
BY
Glascock Downing Seebold
ATTYS.

United States Patent Office 3,024,347
Patented Mar. 6, 1962

3,024,347
METHOD OF WELDING C OR SIMILARLY
SHAPED CHAIN LINKS
Paul Esser, Raderbergerstrasse 202,
Koln-Raderberg, Germany
Filed Sept. 15, 1959, Ser. No. 840,062
Claims priority, application Germany Sept. 17, 1958
6 Claims. (Cl. 219—52)

The present invention relates broadly to the art of uniting metal by welding, especially resistance welding.

More particularly, this invention relates to the welding of metal chain links in the formation of chains.

Specifically, the invention relates to a method of welding C or similarly shaped chain links.

In the formation of metal chains the links are cut from straight rods and are bent into a C shape. Due to the fact that there is compression at the inner circumference and stretching at the outer circumference of the links, the disadvantage arises that the end faces to be joined which, when the wire or rod was cut, were perpendicular to the axis of the rod, now diverge to form a V or wedge-shaped gap. The shorter the link the more divergent is the gap, which is especially prevalent in connection with the making of chains that are to be associated with high or heavy loads. If the C-shaped chain links are closed by known butt welding processes, they are offset after the application of the electrodes to the opposite sides of the gap so that the surfaces to be joined touch one another. This contact, considering a chain link disposed vertically with the gap at the top, occurs at the inner edge of the gap so that welding occurs from the bottom of the gap upwards. Butt welding in this fashion leads to certain disadvantages. In the first place, there is a dripping off of material whereby it becomes necessary to increase the pressure and to provide additional material and, further, the shape of the link becomes irregular. In addition, inner stresses develop and the structure of the weld over its entire area is not symmetrical and homogeneous.

Certain proposals have been made to overcome these disadvantages such as by pressing wedges into the gap between the ends of the link under elastic pressure from opposite sides thereof. It was felt that such an arrangement would provide a symmetrical X-shaped welding seam. This relationship, however, was not obtained in practice because of the V-shaped gap between the ends of the link an unsymmetrical X-shaped welding seam resulted.

Accordingly, the present invention has for an object to provide a method of welding together the ends of links of a chain of C or similar shape which eliminates the foregoing disadvantages and results in a welding process in which the welding occurs from the median portion of the surfaces to be joined outwards to the periphery thereof, whereby reliable and strong welds can be obtained rapidly and economically.

Specifically, the invention provides a method of welding together the ends of C-shaped chain links which includes the insertion between the surfaces to be joined of a solid, shaped filler piece of electrically conductive and fusible material dimensioned and arranged to make contact with the median portion of the faces of the ends to be joined, regardless of the divergence of these faces.

It is a further object to provide particular forms of shaped filler pieces or inserts for utilization in the welding method.

It is an additional object of the invention to provide a welding apparatus including means for supporting a chain link in upright condition for welding, means for applying pressure to the offset ends of the links and for applying electrodes to the link to effect the weld, and which includes a mechanism for feeding shaped filler pieces into successive links prior to their being moved to the welding position.

Figure 2:
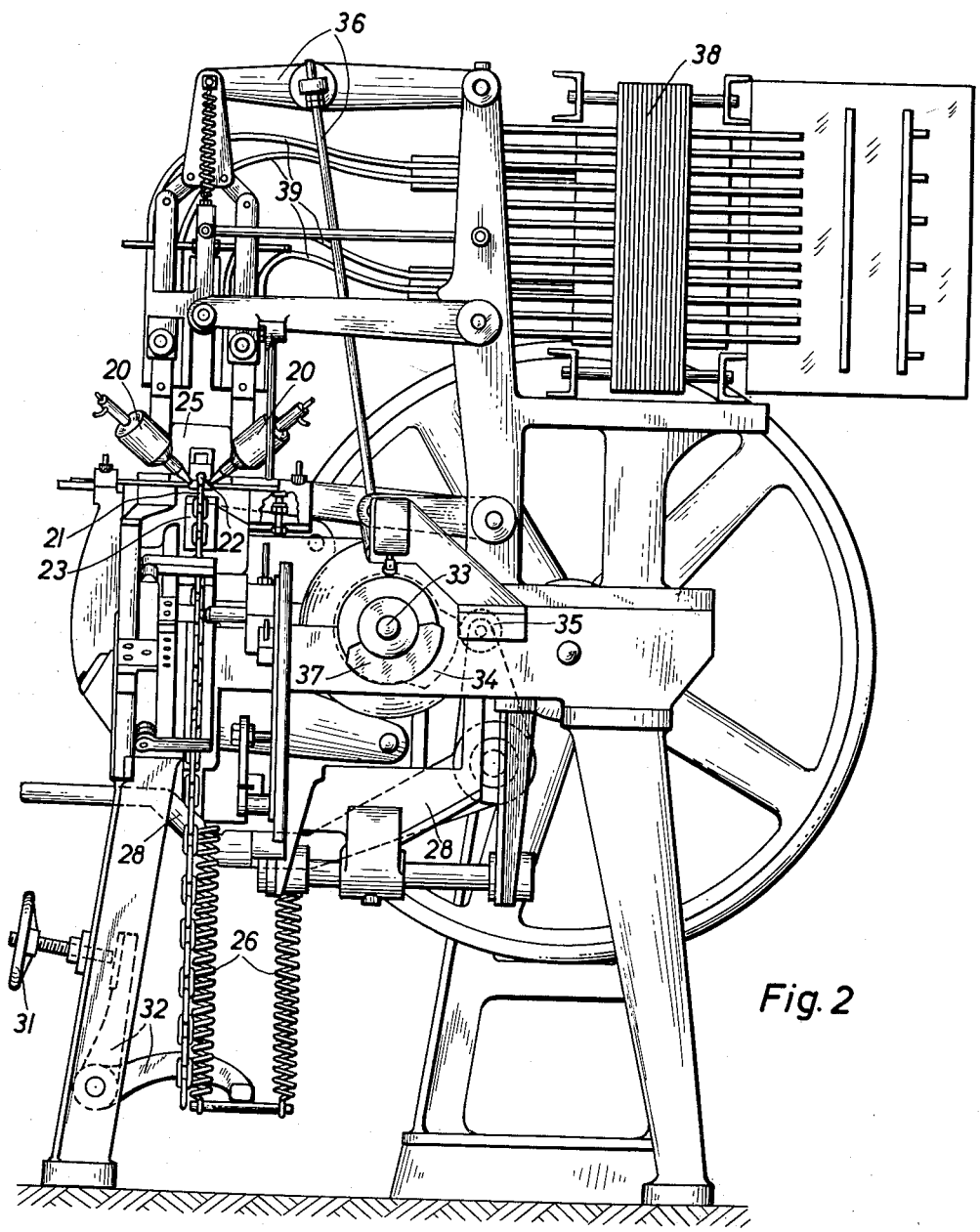
Figure 11:
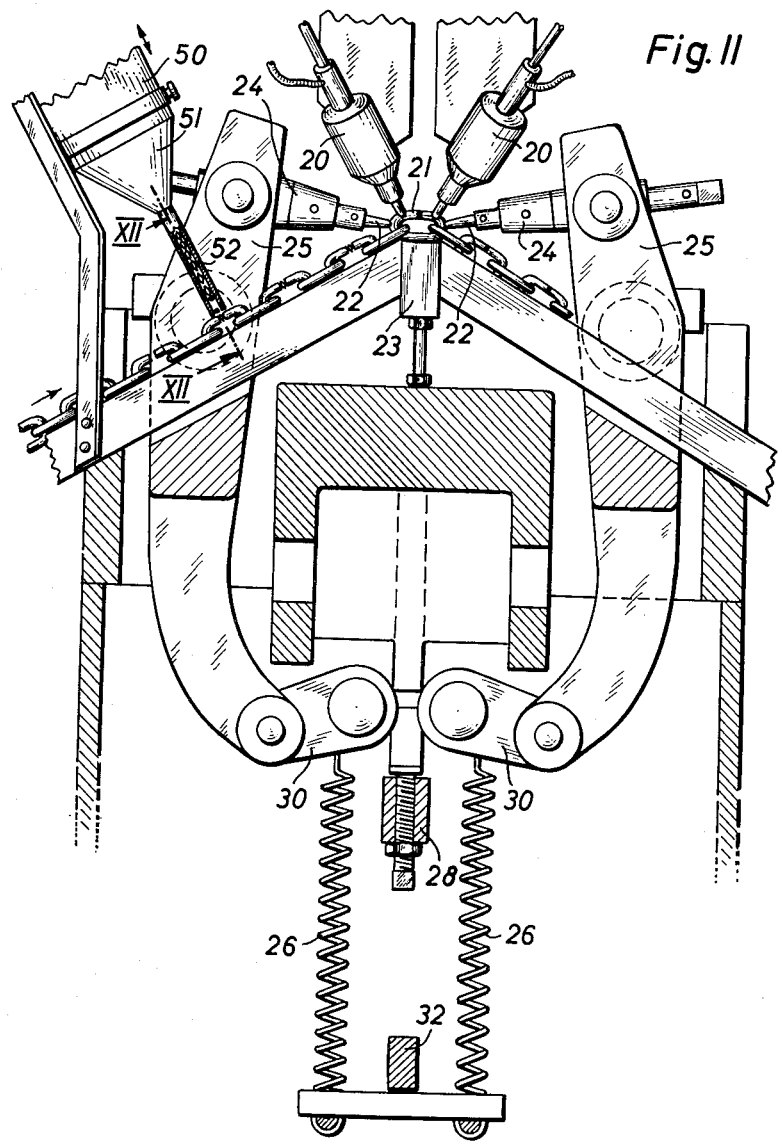

Further and more specific objects will be apparent from the following description taken in connection with the accompanying drawings, in which:

FIGURE 1 is a front view of an automatic welding machine illustrating the supporting of the links in the welding position, FIGURE 2 is a side view of the machine shown in FIGURE 1, FIGURE 3 is an enlarged fragmentary end elevational view illustrating a link, the ends of which are to be welded together, and showing the filler or insert piece in position, FIGURES 4 and 7 are side elevational views of shaped filler pieces, FIGURE 8 is an end elevational view of the filler or insert piece shown in FIGURE 7, FIGURE 9 is an elevational view of a modified form of filler piece consisting of crossed wires, FIGURE 10 is a fragmentary view illustrating the position of the filler piece shown in FIGURE 9 between the end faces of a link to be joined, FIGURE 11 is a fragmentary view partly in section and partly in elevation, illustrating the mechanism for automatically feeding and inserting filler pieces into successive chain links in a welding machine, and FIGURE 12 is a fragmentary diagrammatic view partly in section, along the line XII—XII of FIGURE 11, illustrating in more detail the mechanism for feeding and inserting the filler pieces into the V-shaped gap of successive chain links.

FIGURE 13 is a side view of the mechanism for feeding and inserting the filler pieces shown in FIGURE 12.

In the drawings, FIGURE 1 illustrates a known type of automatic chain welding machine in which the ends of the chain links are connected by resistance welding. This machine includes means for supporting successive links to be welded in the form of a welding saddle 23. Suitable guide means support the chain for movement through the machine with the links to be joined being placed vertically with the V-shaped gap between the end faces thereof at the top of the link as it arrives at the welding saddle. Welding electrodes 20 are applied near the end faces to be joined and the pressure is applied by upsetting tools 22 which act on the narrow sides of the link during welding. Welding machines of this type operate as follows:

After the chain is inserted in the machine the link 21 standing on edge is held by the upsetting tools 22 which are pressed toward one another. Simultaneously, the electrodes 20 are lowered into contact with the link on opposite sides of the gap. When the welding temperature has been attained the welding current is automatically switched off. When the weld is completed the welded link is released and the chain is advanced until the next vertically disposed link is in position on the saddle 23. The chain is moved through the machine until all of the upright links are welded together, following which the chain is again passed through the machine after being turned 90°, so that the links that had been horizontal during the first series of welding operations are now upright or vertical. As shown in the drawings, four electrodes are used, arranged in pairs, so that there is a pair on each side of the gap which encloses the ends of the link to be joined in pincer-like fashion. During the welding process the upsetting tools 22 which are mounted in tool holders 24 on the ends of levers 25 are subjected to the action of spring means 26. The spring means 26 exert downward pull on the cross bar 27 so as to pull the same and the lever 28 downward whereby, through link and lever means including links 30, the levers 25 and thus the tools 22 move toward one another so as to press the ends of the chain links together in order to obtain good current flow through the gap during welding.

As shown in FIGURE 2, a hand wheel 31 and tensioning lever 32 are provided for adjusting the spring means 26. The main lever 28 is a double armed lever, the upper arm of which carries a roller 35 and which is in engagement with a cam 34 carried by rotating cam shaft 33. The cam moves the double armed lever 28 against the action of the spring 26.

The mechanism for transmitting motion to the welding electrodes 20 is likewise controlled from shaft 33 by means of a cam 37 cooperating with a follower of a link and lever mechanism denoted generally at 36. FIGURE 2 shows the welding electrodes 20 in raised and opened position. During the upsetting operation the electrodes 20, mounted in pairs, are pressed against the respective ends of the link to be joined behind the gap, and are moved toward one another in the direction of upsetting so that the ends of the electrodes which engage the surfaces of the link follow any movement of the link ends toward one another. The welding current supply is fed from a transformer 38 to electrodes 20 by flexible conductors 39 which are mounted to follow the movements of the electrodes 20.

FIGURE 3 illustrates a chain link 21 supported in welding position on a saddle 23 and including, in accordance with the teaching of this inventor, an inserted, pressed-in filler or insert piece 40. The link 21 is supported on the saddle with its longitudinal axis extending horizontally and the ends 41 to be welded disposed at the top. The upper legs of the link are, as shown, inclined so that the gap between the end faces 42, 42' is divergent and wider at the top than at the bottom. FIGURE 3 illustrates the relationship prior to welding. After upsetting and welding the link 21 has a symmetrical shape and the upper leg is parallel to the lower leg. The electrodes 20 generate the necessary welding temperature, while the upsetting tools 22 press the link ends together. Filler piece 40 is lens shaped and its opposite faces 43, 43', which make contact with the end faces of the link, are shaped so that the contacting surfaces of the filler piece are smaller than the end faces of the link, whereby welding occurs from the interior of the end faces 42, 42' outwards to the periphery of the link ends during pressing together of these end faces 42, 42'.

FIGURES 4 to 10 illustrate further forms of filler pieces. Thus, filler or insert 44, FIGURE 5, is in the form of a sphere, while the filler piece 45 in FIGURE 6 has the form of a double cone flattened on its outer faces and interconnected by a cylindrical portion. The filler piece shown in FIGURES 7 and 8 is in the form of a double cone-shaped spring. With the filler piece of this form the elasticity of the spring provides an arrangement which can be utilized with chain links having greater variations in the dstance between the end faces 42, 42' because the annular ends 47 of the wire filler piece 46 are resiliently pressed against the end faces of the link to be joined.

The filler or insert 48 shown in FIGURES 9 and 10 is formed of two wires which are spot welded together at their crossing point 49. As shown in FIGURE 10, when a filler or insert of this form is placed between the end faces 42, 42' of the link to be joined the thickened portion of the crossed wires makes contact with the median portion of the surfaces 42, 42'. With all forms of the filler or insert pieces of the invention the same are pressed into the gap between the ends of the link to be welded so that they are held in place by the resilient tension within the link. In all embodiments it is essential that the surface portions of the inserts which make contact with the end faces 42, 42' of the links are smaller than the end faces of the link so that when the filler piece is inserted its opposite faces contact the end faces 42, 42' in the middle or median portion thereof so that the welding process occurs from the interior of the link ends outwards toward the periphery during the pressing together of the ends of the link.

FIGURES 11 and 12 disclose mechanisms for feeding and pressing the filler pieces into the gap between the ends of successive links as moving through an automatic chain welding machine. As clear from FIGURE 11, the magazine 50 which contains a supply of filler pieces is mounted on the inlet side of the saddle 23 in a position spaced therefrom by the distance of several chain links. The magazine 50 includes a feeding funnel 51 and a feed pipe 52 constructed and arranged so that, for example, lens-shaped inserts are disposed in the feed pipe one above the other as shown in FIGURE 12. Above the outlet end of the feed pipe are two vertically spaced openings 52' and 52'' through which are moved the ends of a double check lever 54. The lever 54 is mounted on the exterior of the feed pipe to swing about a pivot 53 and its two ends are offset laterally with one being longer than the other so that rocking of the check lever 54 to the left in FIGURE 12, moves the lower end 54' from beneath the bottom filler piece 40 while the upper end 54'' moves beneath the next filler piece to hold the stack, thus allowing the bottom filler piece to drop to the bottom of the feed pipe. Upon the reverse swinging movement, the upper arm 54'' is moved out of its opening 52' and the lower arm 54' stops the further movement of the stack. The movement of the control lever 54 is coordinated with the movement of the chain through the welding machine so that a filler piece 40 is delivered to each link to be welded. The check or control lever 54 has a depending arm connected to a spring 55 which normally biases the lever to a position such that the lower arm 54' is supporting the stack of inserts 40. By means of the link and lever mechanism 56, 57, control lever 54 is rocked to the left against the action of spring 55. A cam 58 on the control shaft 33 of the welding machine actuates this link and lever mechanism.

Above the outlet end of the feed pipe 52 there is an elongated slot within which is movable a pressing finger 60. This finger is in the form of a double armed lever swingable about a pivot 59 so that when it is moved to the left the finger enters the slot and presses the filler piece 40 into the gap of an upright chain link lying beneath the outlet end of the feed pipe 52. The other arm 64 of the finger is biased by a spring 63 to swing to the right so as to normally withdraw the finger 60 from without the slot. In order to press the insert into the gap a link and lever mechanism 61, 62 is interconnected between the arm 64 of the finger and a cam 58' carried by control shaft 33 so that responsive to the surface of this cam the finger is swung downwards through the slot to engage the top of a filler piece 40 and press it down between the gap between the end faces 42, 42' of a chain link that is at the moment lying beneath the outlet end of the feed pipe. Between the end of the link 61 and the face of the arm 64 of the finger 60 there is interposed a compression spring 65 which permits relative movement between the link or pull rod 61 and the arm 64. By means of an adjustable stop 66 the degree of swinging movement of the finger 60 can be accurately adjusted.

Cams 58, 58' controlling the feeding and inserting of successive filler pieces are mounted on the cam shaft 33 in relation to cams 34 and 37 which move the upsetting tools 22 and electrodes 20 in such a manner that one filler piece is fed and pressed into the gap between the ends of a chain link during one upsetting and welding operation. In other words, the movement of the chain through the machine is intermittent, and while a link is held stationary on the welding saddle a further link is receiving its filler piece.

It is to be pointed out that the filler pieces of the invention, regardless of the shape thereof, can be made of a metal alloy that is different from the alloy of the link. Thus, they can be made of a harder alloy than that of the link and thus have a higher content of carbon, manganese and/or nickel, as compared with the material content of the link to be welded.

Further, the insert or filler piece can include an alloy addition of a fluxing agent or it can be provided with a coating of an oxygen excluding fluxing agent such as quartz.

As regards a lens-shaped filler piece such as 40, the dimensions thereof are to be adapted in accordance with several factors; namely, the diameter of the rod forming the link, the relationship of the V-shaped gap between the end faces of the link, and the elasticity or spring property of the wire or rod making up the link, because this factor determines the distance between the end faces.

The outside diameter of the filler piece can be equal to, smaller than or larger than the diameter of the chain link. A smaller outside diameter of the filler piece has the advantage that less ridge develops during welding so that chains can be produced which do not require any burring or smoothing off of the welding ridges. If the filler piece has the same diameter as the end of the link the inserting mechanism can utilize the link itself as a stop gauge. On the other hand, if the filler or insert has a greater diameter than the link, in certain instances this factor is advantageous because it permits the utilization of a greater inserting pressure and leads to a weld having a sound edge zone.

In any event, the invention is directed to the insertion of a filler piece into a divergent gap between the ends of a link to be joined, and in which the contacting faces of the filler piece prior to welding are smaller than the faces to be joined and make contact with such faces approximately at the mid-center thereof so that the weld is formed from the interior of the link end faces outwards.

It is believed clear that when carrying out the method of the present invention the reduced contact area between the opposite ends of the insert or filler piece with the approximate mid-portion of the end faces of the link to be welded will result in an initial high welding temperature at the center portion of such end faces, thereby effecting a more rapid and thorough welding.

Basically, the invention comprises prior to welding inserting an insert of electrically conductive and fusible material into the gap between the end faces to be welded while contacting the opposite end portions of the insert with only the median portions of the respective end faces, following which the link to be welded is supported, upset from opposite ends and an electrical welding current is passed through the link and insert.

While the invention has been described with particular reference to C-shaped links, it is pointed out that it is sometimes applicable to the welding of U-shaped double links.

Automatic chain welding machines, in which the ends of the chain links are connected by resistance welding, as shown in the FIGURES 1 and 2, are disclosed for example by the United States Patents 2,406,694, 2,464,752 and the German Patents 969,236, 1,013,496 and 1,022,884.

Examples of alloy compositions of the inserts relating to allow compositions of the chain links to be welded:

| Alloy steel of the filler pieces: Percent | Alloy steel of the chain links: Percent |
|---|---|
| (1) C=0.17–0.24 | C=0.12–0.16 |
| Mn=0.60–0.95 | Mn=0.65–0.85 |
| Si=0.20–0.35 | Si=0.10–0.20 |
| P=0.04 | $P_{max}$=0.04 |
| S=0.04 | $S_{max}$=0.04 |
| Mo=0.15–0.25 | |
| Ni=0.35–0.75 | |
| (2) C=0.30–0.40 | C=0.17–0.24 |
| Mn=0.70–0.90 | Mn=0.60–0.95 |
| | Si=0.20–0.35 |
| | P=0.04 |
| | S=0.04 |
| | Mo=0.15–0.25 |
| | Ni=0.35–0.75 |
| | (SAE—8620H) |
| (3) C=0.30–0.40 | C=0.18–0.23 |
| Mn=0.70–0.90 | Mn=0.70–0.90 |
| | Si=0.20–0.35 |
| | P=0.04 |
| | S=0.04 |
| | Mo=0.20–0.30 |
| | Ni=1.65–2.00 |
| | (AISI 4620) |

What is claimed is:

1. A method of welding C-shaped chain links to form closed links, comprising pressing a solid insert of electrically conductive and fusible material wedgingly into the gap between the ends of the C-shaped link to be welded and into contact with only the central portions of the end faces of the link, applying electrical welding current thereto and pressing the ends of the C-shaped link together to butt weld the ends of the links together with the welding occurring from the median portion of the link ends outwards towards the perimeter of the link.

2. A method of welding C-shaped chain links to form closed links, comprising wedgingly inserting a shaped insert of electrically conductive and fusible material into the divergent gap between the ends of the link to be welded with such insert having opposite portions of less cross-sectional area than that of the spaced ends of the link so as to contact the median portion of such link ends, holding such link stationary and applying pressure against opposite ends of the link while engaging electrodes into contact with the link on opposite sides of the gap and supplying electric welding current through such electrodes and across said gap through said insert to butt weld the ends of the link together with the welding occurring from the median portion of the link ends outwards toward the perimeter of the link.

3. A method of producing welded chain comprising severing chain stock to link lengths, bending such lengths to form links having a divergent gap between the link ends to be welded together, assembling the links together, supporting successive links with the gap and insert therein directed upwardly, wedgingly pressing an inert of electrically conductive and fusible material into each divergent gap and into contact with only the median portions of the respective link ends, applying pressure against opposite ends of a supported link while engaging electrodes into contact with the supported link on opposite sides of the gap and supplying electrical welding current through such electrodes to butt weld the ends of the link together with the welding occurring from the median portion of the link ends outwards toward the perimeter of the link.

4. A method of making welded chain links comprising the steps of bending a length of rod into C-shape to form an open link with the ends of the rod spaced slightly and with the surfaces of the rod ends lying in divergent planes, placing said link in position with the planes of said rod ends diverging upwardly, placing a solid insert of electrically conductive fusable material between said rod ends, pressing said insert to wedgingly engage said rod ends, applying a welding current to said rod ends to pass through said insert and applying pressure to the link to force said rod ends together, to secure the rod ends together by fusion of said insert to said rod ends.

5. A method of making a welded chain link comprising the steps of bending a length of rod into a C-shape to form an open link with the rod ends spaced from each other slightly and with the surfaces of the rod ends lying in divergent planes, placing said link in position with the planes of said rod ends diverging upwardly, placing a lens-shaped insert of electrically conductive fusable welding material between the said rod ends, pressing said insert into position substantially concentric with said rod ends to be wedgingly gripped thereby, applying electricity to said rod ends to flow through said insert to cause said insert to melt, and simultaneously subjecting said link to bending stress to press said rod ends together as said insert melts.

6. A method of forming a welded link chain comprising the steps of welding half the links to form closed links, securing said closed links to each other by links formed of lengths of rod bent into C-shape with the ends of each C-shaped link spaced slightly and with the surfaces of the rod ends lying in divergent planes, feeding said open links, assembled with said closed links, one at a time in succession to a first station, placing an insert between the ends of each said C-shaped link and pressing said insert into wedging engagement between the ends of said C-shaped link, moving said C-shaped link with said insert held therein to a welding station, applying a welding current to the ends of said C-shaped link to pass through said insert, and applying pressure to the C-shaped link to force said ends together as said insert melts under said welding current to secure said ends together by fusion of said insert to said rod ends.

References Cited in the file of this patent

UNITED STATES PATENTS

| | | |
|---|---|---|
| 434,468 | Robb | Aug. 19, 1890 |
| 497,808 | Moxham | May 23, 1893 |
| 1,039,135 | Johnson | Sept. 24, 1912 |
| 1,510,197 | Ryan | Sept. 10, 1924 |
| 1,677,205 | Pugh | July 17, 1928 |
| 2,115,707 | Crecca et al. | May 3, 1938 |
| 2,203,287 | Smith | June 4, 1940 |
| 2,518,463 | Graham | Aug. 15, 1950 |

OTHER REFERENCES

German application 1,021,520, Printed Dec. 27, 1957, K121h.